United States Patent [19]
Durham et al.

[11] Patent Number: 5,893,943
[45] Date of Patent: Apr. 13, 1999

[54] METHOD AND APPARATUS FOR DECREASED UNDESIRED PARTICLE EMISSIONS IN GAS STREAMS

[75] Inventors: Michael Dean Durham, Castle Rock; Richard John Schlager, Aurora; Timothy George Ebner, Westminster; Robin Michele Stewart, Arvada; Cynthia Jean Bustard, Littleton, all of Colo.

[73] Assignee: ADA Environmental Solutions, LLC, Englewood, Colo.

[21] Appl. No.: 08/097,455

[22] Filed: Jul. 26, 1993

[51] Int. Cl.[6] ......................................... B03C 3/013
[52] U.S. Cl. .................. 95/65; 55/302; 95/68; 95/72; 95/78; 95/152; 95/214; 95/280; 96/27; 96/50; 96/53; 96/74; 96/361; 261/116
[58] Field of Search .................. 95/4, 71, 72, 64–66, 95/78, 214, 230, 68, 149, 152, 279, 280; 96/27, 52, 53, 74, 50, 361–364; 261/116; 55/259, 261, 341.4, 341.1, 302

[56] References Cited

U.S. PATENT DOCUMENTS

| | | | |
|---|---|---|---|
| 2,501,436 | 3/1950 | Cleveland et al. | 95/60 X |
| 2,602,734 | 7/1952 | Hedberg et al. | 95/71 X |
| 2,720,939 | 10/1955 | Stokes | 95/65 |
| 2,746,563 | 5/1956 | Harlow | 95/73 X |
| 3,284,990 | 11/1966 | Orne | 95/59 |
| 3,494,099 | 2/1970 | Eng et al. | 95/64 X |
| 3,523,407 | 8/1970 | Humbert | 96/19 |
| 3,665,676 | 5/1972 | McKewen | 95/4 |
| 3,755,122 | 8/1973 | Melcher et al. | 95/64 X |
| 3,783,158 | 1/1974 | Platzke et al. | 95/66 X |
| 3,807,137 | 4/1974 | Rommel | 95/72 |
| 3,918,935 | 11/1975 | Livingston | 55/228 X |
| 4,042,348 | 8/1977 | Bennett et al. | 423/215.5 X |
| 4,043,768 | 8/1977 | Bennett et al. | 423/215.5 X |
| 4,070,424 | 1/1978 | Olson et al. | 261/142 |
| 4,095,962 | 6/1978 | Richards | 95/65 |
| 4,113,447 | 9/1978 | Bennett et al. | 55/262 X |
| 4,123,234 | 10/1978 | Vossos | 95/71 X |
| 4,132,535 | 1/1979 | Rivers, Jr. et al. | 95/149 X |
| 4,177,043 | 12/1979 | Albanese | 95/71 |
| 4,222,748 | 9/1980 | Argo et al. | 95/64 |
| 4,239,504 | 12/1980 | Polizzotti et al. | 95/71 X |
| 4,306,885 | 12/1981 | Kober et al. | 423/215.5 X |
| 4,325,711 | 4/1982 | Kober et al. | 95/72 |
| 4,541,844 | 9/1985 | Malcolm | 95/64 |
| 4,629,572 | 12/1986 | Leitz et al. | 95/152 X |
| 4,738,690 | 4/1988 | Radway et al. | 95/71 X |
| 4,874,402 | 10/1989 | Vogel | 55/222 X |
| 4,885,139 | 12/1989 | Sparks et al. | 95/65 X |
| 4,888,158 | 12/1989 | Downs | 423/243.04 |
| 4,908,194 | 3/1990 | Hooper | 423/235 |
| 4,931,073 | 6/1990 | Miller et al. | 95/280 |
| 4,935,209 | 6/1990 | Pfoutz | 422/128 |
| 4,954,324 | 9/1990 | Hooper | 423/239 |
| 4,999,167 | 3/1991 | Skelley et al. | 422/175 |
| 5,032,154 | 7/1991 | Wright | 422/109 |
| 5,034,030 | 7/1991 | Miller et al. | 95/279 |
| 5,066,316 | 11/1991 | Ikeda | 96/52 |
| 5,074,226 | 12/1991 | Lynch | 110/345 |
| 5,196,038 | 3/1993 | Wright | 95/58 |
| 5,240,470 | 8/1993 | Wright | 95/58 |
| 5,261,931 | 11/1993 | Wright | 95/3 |
| 5,288,303 | 2/1994 | Woracek et al. | 95/2 |
| 5,356,597 | 10/1994 | Wright et al. | 96/74 X |
| 5,370,720 | 12/1994 | Duncan | 96/72 X |
| 5,449,390 | 9/1995 | Duncan et al. | 95/72 X |
| 5,547,495 | 8/1996 | Wright | 96/52 X |

FOREIGN PATENT DOCUMENTS

| | | | |
|---|---|---|---|
| 1102109 | 3/1961 | Germany | 95/71 |
| 3421270 | 12/1985 | Germany | 95/152 |

OTHER PUBLICATIONS

Krigmont, Coe, Miller, and Laudal; "Enhanced ESP Fine Particle Control by Flue Gas Conditioning" EPRI Ninth Particulate Control Symposium, Oct. 15–18, 1991, pp. 1–21.

*Primary Examiner*—Richard L. Chiesa
*Attorney, Agent, or Firm*—Sheridan Ross P.C.

[57] ABSTRACT

The present invention discloses a process for removing undesired particles from a gas stream including the steps of contacting a composition containing an adhesive with the gas stream; collecting the undesired particles and adhesive on a collection surface to form an aggregate comprising the adhesive and undesired particles on the collection surface; and removing the agglomerate from the collection zone. The composition may then be atomized and injected into the gas stream. The composition may include a liquid that vaporizes in the gas stream. After the liquid vaporizes, adhesive particles are entrained in the gas stream. The process may be applied to electrostatic precipitators and filtration systems to improve undesired particle collection efficiency.

48 Claims, 2 Drawing Sheets

METHOD AND APPARATUS FOR DECREASED UNDESIRED PARTICLE EMISSIONS IN GAS STREAMS

This invention was made with Government support under Contract No. DE-AC22-91PC90364 awarded by the Department of Energy. The Government has certain rights in this invention.

FIELD OF THE INVENTION

The present invention is a method and apparatus for removing undesired particles, such as fly ash, from gas streams. More particularly, the present invention embodies an improved approach for removing such undesired particles by selectively introducing adhesives into the gas stream.

BACKGROUND OF THE INVENTION

Environmental standards for particulate emissions by coal-fired electrical power plants, petroleum refineries, chemical plants, pulp and paper plants, cement plants, and other particulate-emitting facilities are becoming increasingly more demanding. For example, air quality standards in the United States now require power plants to remove more than 99 percent of the fly ash produced by coal combustion before flue gas may be discharged into the atmosphere. As environmental standards tighten, there is a corresponding need for a more efficient means of particulate removal.

Electrostatic precipitators and filtration systems are two commonly used devices for the removal of undesired particles from the gas streams produced by plants and refineries. As used herein, "undesired particles" refers to any particulate matter that is desired to be removed from a gas stream. In electrostatic precipitators, undesired particle-laden gases pass negatively charged corona electrodes which impart a negative charge to the undesired particles. The charged particles then migrate towards positively charged collection plates alternately positioned between the corona electrodes. The undesired particles accumulate on the collection plates and are removed by various techniques, including sonic horn blasts or rapping of the collection plates. Electrostatic precipitators may employ one stage for both the charging and collection of undesired particles or multiple stages with the charging and collection being done in different stages.

Filtration systems, such as baghouses, remove undesired particles from gas streams by passing the gas streams through large filters. The filters have pores large enough to pass the gases in the gas stream but small enough to prevent passage of undesired particles. The filters may be of a fabric, metal, paper or ceramic construction. The undesired particles can be removed from a filter by many techniques including shakers, pulse jets, or reverse gas flow.

In both electrostatic precipitators and filtration systems, efficiency and cost are critical considerations. The efficiency of electrostatic precipitators is decreased by undesired particle reentrainment into a gas stream during the removal of undesired particles from the collection plates. Field studies have shown that as much as 80 percent of the particulate emissions into the atmosphere from electrostatic precipitators result from such reentrainment.

Filtration system efficiency is decreased by the build-up of undesired particles on the filter. Particle build-up clogs filter pores, hindering the passage of the gas stream through the filter, which causes a large pressure drop across the filter. To reduce the pressure drop, the filters require frequent cleaning to reduce the build-up of undesired particles on the filter. The need to frequently clean the filters increases not only operating costs but also undesired particle emissions.

Numerous approaches have been proposed for increasing the efficiency of electrostatic precipitators and filtration systems. In one approach, ammonia gas and sulfur trioxide may be injected into a gas stream to form ammonium sulfates on the surfaces of undesired particles. This approach has several drawbacks. First, a possible product of the reaction between ammonia gas and sulfur gas is ammonium bisulfate which fouls the electrostatic precipitator or filtration system components. Such component fouling impairs the operation of the components and increases undesired particle emissions and unit operating costs. Second, the use of ammonia gas in the gas stream may require additional downstream gas purification steps to remove unreacted ammonia gas from the gas stream prior to discharge. Ammonia gas is known to create environmental damage and increase the opacity of the discharged gas stream. Finally, the odor associated with ammonia may also cause problems in the disposal of the undesired particles after collection.

Another approach to reduce undesired particle emissions is to employ a wetted collection surface. In such "wet systems," a liquid, typically water, is supplied to the collection surface to enhance undesired particle collection and reduce reentrainment. Unless expensive materials are employed, however, components of wet systems can suffer high corrosion rates due to acid formation.

Other approaches to increase electrostatic precipitator and filtration system efficiency similarly require the addition of expensive components to new or existing units and/or otherwise raise other operational complications.

SUMMARY OF THE INVENTION

It is, therefore, an object of the present invention to increase the efficiency of electrostatic precipitators and filtration systems in the removal of undesired particles from a gas stream, preferably without significantly increasing capital and operating costs.

It is a further objective to increase electrostatic precipitator and filtration systems efficiency without the use of toxic additives.

It is a further objective to increase electrostatic precipitator and filtration system efficiency by methods and apparatus that are readily adaptable to existing designs.

It is a further objective to reduce undesired particle reentrainment during removal of undesired particles from a collection surface.

In one aspect of the present invention, a method for removing undesired particles from a gas stream is provided including the steps of (i) contacting a gas stream containing undesired particles and water vapor with an adhesive composition; (ii) collecting the undesired particles and the adhesive composition on at least one collection surface to form an agglomerate at a temperature greater than the condensation temperature of the water vapor in the gas stream; and (iii) removing the agglomerate from the collection surface. As used herein, "adhesive" refers to any substance, inorganic or organic, natural or synthetic, that is capable of adhering or bonding other substances together by surface attachment. "Agglomerate" refers to a cluster or accumulation of undesired particles and adhesive particles. "Condensation temperature" refers to the temperature at which a given vapor component of a gas stream condenses into a liquid under ambient pressure.

Preferably, the adhesive in the composition is nontoxic and substantially odorless. An adhesive is typically deemed "nontoxic" if the presence of the adhesive in the resultant agglomerate does not cause the agglomerate to be environmentally unacceptable under the standards and procedures set forth in the Toxicity Characteristic Leaching Procedure ("TCLP") established by the United States Environmental Protection Agency. The TCLP provides analysis procedures for waste materials to detect environmentally unacceptable levels of substances, including inorganic elements, volatile organic compounds, and semi-volatile organic compounds. The TCLP specifies the maximum acceptable concentration for such substances. An adhesive is deemed to be "odorless" if the presence of the adhesive in the agglomerate cannot be detected by the human nose.

Preferred adhesives are selected from the group consisting of gums, cellulose, vinyls, and derivatives and mixtures thereof. More preferably, the adhesive should be selected from the group consisting of xanthan gum, carboxymethyl cellulose and mixtures thereof. As used herein, "gum" refers to a carbohydrate high polymer that is insoluble in alcohol and other organic solvents, but generally soluble or dispersible in water. "Cellulose" refers to a natural carbohydrate high polymer (polysaccharide) containing anhydroglucose units joined by an oxygen linkage to form long molecular chains. "Vinyls" refers to a polymer having the linkage $CH_2=CH-$ in the polymer chain.

The adhesive composition may include a surfactant to enhance agglomerate formation. The adhesive composition may also include a dispersant to control agglomerate porosity, especially in filtration plant applications. As used herein, "surfactant" refers to any substance that alters the surface tension of another substance. "Dispersant" refers to any substance that influences the distance between undesired particles in the agglomerate.

The adhesive composition is preferably introduced into the gas stream in a dispersed and uniform manner. In this regard, the adhesive composition can be atomized upon introduction utilizing a "carrier fluid" component. The carrier fluid may be a gas or liquid, such as water, that is a solvent for the adhesive and that vaporizes in the gas stream.

After contact with the gas stream, a substantial portion of the carrier fluid, preferably about 90% or more by weight, separates from the adhesive by vaporization prior to reaching the collection surface. Upon separation, dispersed particles of the adhesive will remain in the gas stream with the undesired particles. Upon contact with the collection surface, the adhesive particles and the undesired particles to be removed form the agglomerate. Preferably, to yield a substantially "dry system," the temperature of the collection surface in the collecting step is greater than both the condensation temperature of the water vapor in the gas stream and any vaporized carrier fluid. As used herein, a "dry system" refers to a system that employs a substantially dry collection surface (i.e., having substantially no liquid in contact therewith) for undesired particles.

The gas stream may be advantageously deflected, as may be desired, prior to contacting the collection surface to achieve, for example, uniform incidence of the particles on the collection surface, thereby yielding an agglomerate of a more uniform thickness.

After a predetermined build-up, the agglomerate of undesired particles and adhesive particles may be removed from the collection surface, collected in a hopper and removed from the unit. Removal may be accomplished by vibration of the collection surface, removing the collection surface from the collection zone, or contacting the collection surface with a reverse gas stream having a direction of flow substantially opposite to the gas stream.

In a related aspect of the invention, an apparatus for undesired particle removal is disclosed that includes (i) a housing; (ii) an inlet and outlet for the gas stream; (iii) an injection apparatus to inject an adhesive composition into the gas stream; and (iv) one or more collection surfaces supportably positioned within the housing to collect both the undesired particles to be removed and adhesive particles which, in turn, form an agglomerate on the collection surface. The apparatus may include a plurality of collection surfaces and one or more hoppers to collect the agglomerate that is removed from the collection surface.

The adhesive injection apparatus is preferably a plurality of dispersion devices (e.g., nozzles) positioned within and/or across the gas stream to uniformly disperse the adhesive composition into the gas stream. The adhesive injection apparatus may be advantageously located upstream of the collection surface at a distance sufficient for a substantial portion of any carrier fluid, preferably about 90% or more by weight, to separate by vaporization from the particles before the particles contact the collection surface. A deflecting apparatus may be provided to deflect and uniformly distribute the gas stream prior to contacting the collection surfaces so as to improve the uniformity of agglomerate build-up on the collection surfaces. Such deflecting apparatus may comprise, for example, a plurality of selectively adjustable baffles (e.g., horizontally, vertically, and/or angularly) disposed across the gas stream.

In an electrostatic precipitator embodiment of the present invention, the apparatus may include a power supply; at least one electrode connected to the negative terminal of the power supply and positioned relative to the input gas stream to impart a charge to the undesired particles to be removed and the adhesive particles; and at least one collection surface connected to the positive terminal of the power supply and positioned parallel to the flow of the gas stream. To enhance agglomerate formation, electrostatic injection nozzles (such as charged-fog nozzles or those employed in many paint sprayers) may be employed to inject the adhesive composition. That is, the use of such nozzles may serve to impart additional charge to adhesive composition droplets upon atomization, thereby increasing the collection of adhesive particles on the collection surfaces, particularly if an anionic or nonionic adhesive is utilized. To lower the resistivity of the agglomerate formed on the collection surface, and thereby reduce sparkover or back corona discharge, the carrier fluid in the adhesive composition may also be advantageously utilized to cool the gas stream and undesired particles contained therein. For such purposes, the predetermined injection rate is preferably selected to achieve a desired degree of cooling, while yet allowing for a substantial portion of the carrier fluid to vaporize before reaching the collection surface. It is believed that such an approach may have particular application in low-sulphur content coal burning facilities in view of the relatively low acid dew point of the resulting gas streams.

In a filtration system embodiment of the present invention, the collection surface may be a filter located transverse to the direction of flow of the gas stream to separate the undesired particles and adhesive particles from the gas stream. Such filter may be of ceramic, fabric, paper or metal construction. Preferably, the adhesive injection apparatus and/or filter are selected such that a substantial portion of the adhesive particles dispersed into the gas stream are larger than the pore size of the filter.

The present invention has numerous advantages over existing methods and apparatus. Electrostatic precipitator and filtration system efficiency are increased by less reentrainment of undesired particles. The adhesive particles increase the force of attraction between undesired particles in the agglomerate of undesired particles and adhesive particles. The resulting agglomerate of undesired particles and adhesive particles on the collection surface, or dust cake, is not only more cohesive but also more porous. In electrostatic precipitators, the cohesiveness of the dust cake reduces fragmentation and undesired particle reentrainment during dust cake removal. In filtration systems, the particle cohesion produces increased porosity of the dust cake which reduces the pressure drop across the filter (and therefore requires less frequent filter cleanings). The cohesiveness of the dust cake also reduces "bleeding" of very fine undesired particles through the filter pores caused by compaction of undesired particles on the filter surface, thus increasing efficiency.

The present invention is also particularly advantageous as it preferably yields a "dry system," which has numerous advantages relative to a wet system.

Additionally, the method not only employs low cost components and additives that improve the efficiency of new electrostatic precipitators and filtration systems but also is readily adaptable to existing units. Further advantages will be apparent to those skilled in the art.

DETAILED DESCRIPTION

Figures 1, 3:
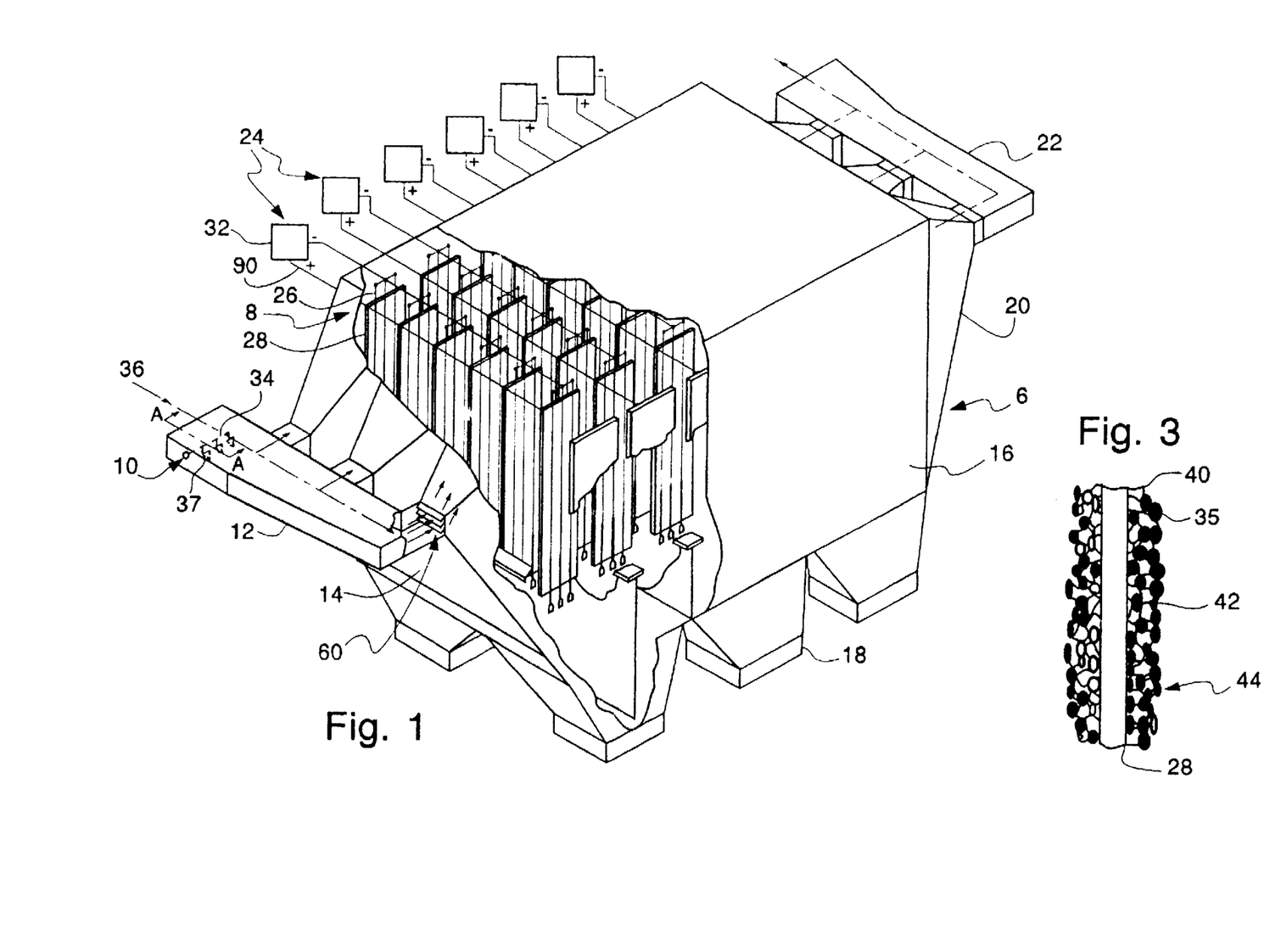
FIG. 1 is a perspective view of a first embodiment of the present invention in an electrostatic precipitator.
FIG. 3 is a side view of a collection plate showing an accumulation of adhesive particles and undesired particles on the collection plate.
Figures 2, 4, 5:
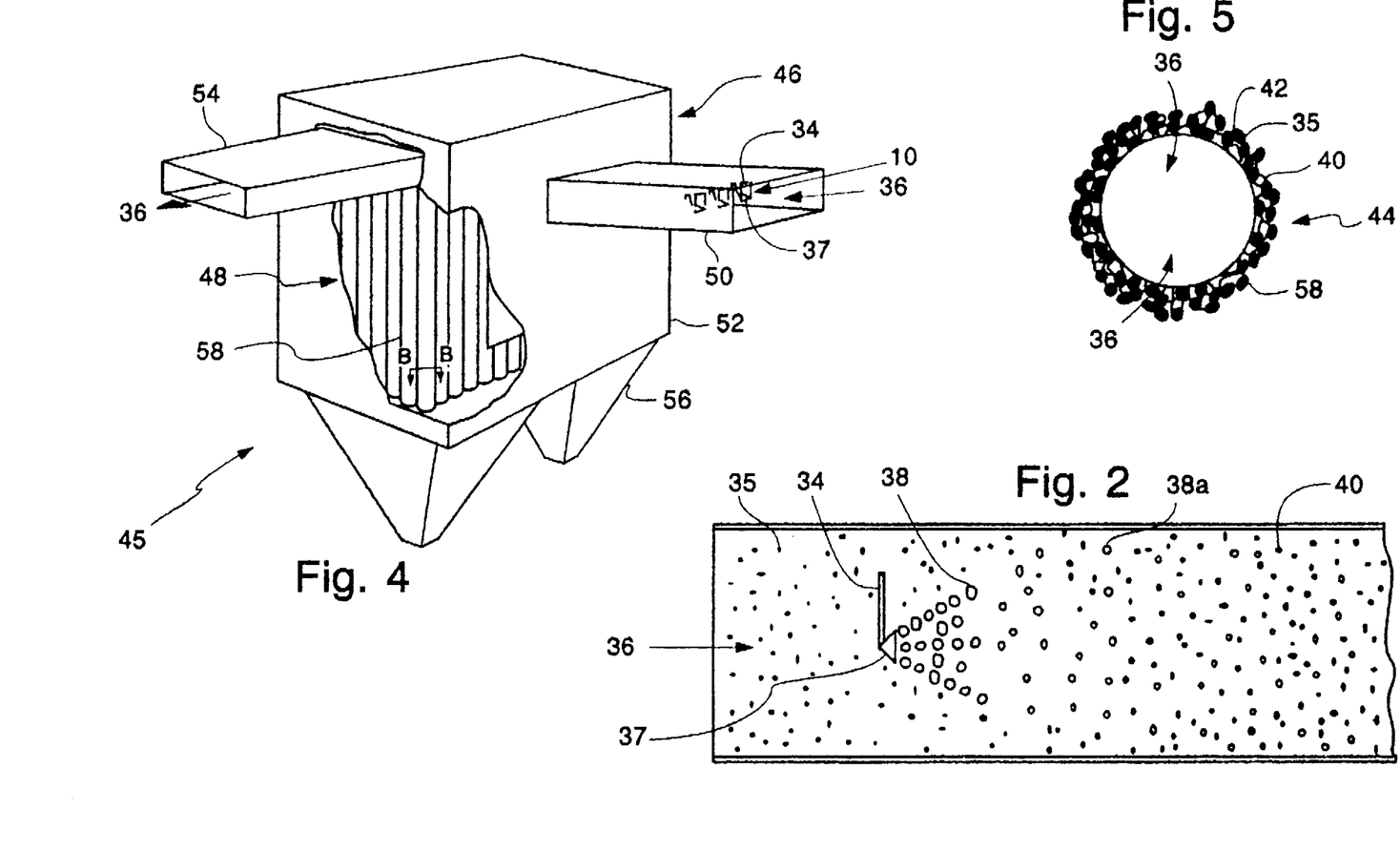
FIG. 2 is a cut away view along line A—A of FIG. 1 showing the adhesive injection device spraying droplets of an adhesive composition into the gas stream.
FIG. 4 is a perspective view of a second embodiment of the present invention in a filtration system.
FIG. 5 is a cut away view along line B—B of FIG. 4 showing an accumulation of adhesive particles and undesired particles on the filter surface.

FIGS. 1 and 2 depict a first embodiment of the present invention as implemented in an electrostatic precipitator for removal of undesired particles such as fly ash from a gas stream. The electrostatic precipitator comprises housing assembly 6, precipitating assembly 8, and adhesive injection assembly 10. The housing assembly 6 includes an input duct 12, one or more input plenums 14, shell 16, one or more hoppers 18, one or more output plenums 20, and output duct 22.

The precipitating assembly 8 includes a plurality of sections 24. Each section 24 includes a plurality of alternately disposed discharge electrodes 26 and collection plates 28, a corresponding plurality of electrical conductors 30, and an interconnected power supply 32. The negative and positive terminals of the power supply 32 are connected to the discharge electrodes 26 and collection plates 28, respectively.

The adhesive injection assembly 10 includes a reservoir (not shown) and an interconnected feed line 34 and plurality of nozzles 37. As will be appreciated, the gas stream may be contacted with an adhesive composition continuously or intermittently and by many different methods. Adhesive injection assembly 10 achieves contacting by atomizing a composition comprising a carrier fluid and an adhesive into the gas stream 36 in the form of droplets 38. Atomization may be realized by a number of different methodologies, including spraying the composition through a nozzle. To enhance charging of the droplets, particularly if an anionic or nonionic adhesive is employed, electrostatic injection nozzles may be utilized. While preferred, a carrier fluid is not required to disperse adhesive particles in gas stream 36. By way of example, adhesive particles 40 may be simply dripped into gas stream 36 by a suitable device (e.g., drip emitters).

As illustrated, adhesive injection assembly 10 should be located upstream of the precipitating assembly 8. Preferably, the adhesive injection assembly 10 is disposed so as to provide a sufficient distance between the adhesive injection assembly 10 and the nearest of the collection plates 28 such that, prior to contacting the nearest collection plate 28, a substantial portion of the carrier fluid, preferably about 90% or more by weight, has separated from the adhesive and a substantially uniform dispersion of adhesive particles 40 across the gas stream 36 has been attained. To accomplish this, adhesive injection assembly 10 may be advantageously located in input duct 12 with nozzles 37 evenly spaced across and within the gas stream 36 as illustrated.

Gas stream 36 may be deflected by baffles 60 prior to contacting collection plates 28 to achieve a more uniform incidence of undesired particles 35 and adhesive particles 40 on collection plates 28, thereby yielding an agglomerate of a more uniform thickness on collection plates 28.

Adhesives utilized in the present invention should be nontoxic, substantially odorless, and soluble in a suitable fluid carrier, such as water. Further, the adhesives preferably should be organic compounds, such as polymers. Preferred classes of polymers are gums, cellulose, vinyls and derivatives and mixtures thereof. For polymer adhesives, generally, the desired droplet size 38 upon injection of the adhesive composition via nozzles 37 is from about 10 to about 100 micrometers.

It is believed that the ionic characteristics of the molecules of the adhesive utilized can impact the performance of the present invention. That is, in electrostatic precipitator applications, adhesives that are anionic and nonionic may be preferable since they are believed to more readily accept a negative charge from electrodes 26 than cationic molecules. Consequently, it is theorized that anionic and nonionic molecules will more readily collect on collection plates 28 than cationic molecules, thereby enhancing agglomerate formation.

In operation, gas stream 36 containing undesired particles 35 is passed through input duct 10 and input plenums 14 into electrostatic precipitator shell 16. Prior to entering electrostatic precipitator shell 16, gas stream 36 passes adhesive injection assembly 10. Adhesive injection assembly 10 disperses droplets 38 containing adhesive particles 40 into gas stream 36.

As noted above, the contacting of the adhesive with the gas stream may be facilitated by use of a carrier fluid. The carrier fluid may be any gas or liquid that is nontoxic, substantially odorless, and capable of transporting the adhesive over a desired distance. Additionally, in the case of a liquid carrier fluid, the carrier should be a solvent for the adhesive utilized. Preferably, the carrier fluid is a liquid, such as water, that readily vaporizes at the temperature and pressure to which the gas stream is subjected.

The specific desired concentration of the adhesive in the liquid carrier fluid primarily depends on the identity of the carrier fluid, the desired size and amount of adhesive particles 40 to be introduced into the gas stream 36, and the size of the droplet 38 to be injected in the gas stream 36. In general, however, the concentration of adhesive in the carrier fluid (e.g., water) preferably ranges from about 0.005% to about 10% by volume, and more preferably from about 0.05% to about 1% by volume. Lower concentrations may for example be employed in low-sulphur content coal burning applications where, in addition to adhesive particle dispersal, the carrier fluid is advantageously employed to cool the gas stream, thereby reducing the resistivity of the agglomerate and the incidence of sparkover. The adhesive composition should be thoroughly mixed prior to injection into gas stream 36.

The specific desired concentration of the adhesive particles 40 to be dispersed in gas stream 36 is established primarily based upon the concentration and size distribution of undesired particles 35 in gas stream 36, the tacticity of the adhesive, and the desired concentration of undesired particles 35 in gas stream 36 after treatment. In general, however, the concentration of adhesive particles 40 relative to undesired particles 35 in gas stream 36 preferably ranges from about 0.01% to about 1% by weight.

After the droplets 38 are injected into gas stream 36, droplets 38 are carried downstream by gas stream 36. As the droplets 38 are carried downstream, droplets 38 decrease in size due to vaporization of the liquid carrier fluid and become smaller droplets **38*a*. As the liquid carrier fluid vaporizes, adhesive particles 40 formerly contained in droplets 38, 38*a*, will be dispersed and entrained in gas stream 36 along with undesired particles 35. As noted, about 90% or more by weight of the liquid carrier fluid in a given droplet 38 has preferably evaporated before adhesive particles 40 contact collection plates 28**.

The desired size distribution of adhesive particles 40 produced after vaporization of the liquid carrier fluid is a function of several factors including the size distribution of undesired particles 35, the density of the adhesive, and the viscosity of the adhesive. Preferably, however, the size of the adhesive particles 40 ranges from about 1 to about 10 micrometers.

The vaporization time for the liquid carrier fluid in a droplet 38 primarily depends upon the size of droplet 38, the volatility of the liquid carrier fluid, and the temperature, pressure and composition of the gas stream 36. In general, however, the preferable vaporization time for the liquid carrier fluid should be less than about two seconds and in most cases less than about 1 second.

After vaporization of the liquid carrier fluid, the adhesive particles 40 contact collection plates 28. The temperature of both the collection plate surface and the agglomerate of undesired particles 35 and adhesive particles 40 collected on the surface is preferably above the condensation temperature of water vapor in gas stream 36. Further, the temperature of both the collection plate surface and the agglomerate is preferably above the condensation temperature of the vaporized liquid carrier fluid.

Gas stream 36 containing undesired particles 35 and dispersed adhesive particles 40 enters electrostatic precipitator shell 16. Discharge electrodes 26 impart a negative electrical charge to undesired particles 35 and adhesive particles 40. The negatively charged particles adhere to the positively charged collection plates 28. As the input gas stream moves from upstream section 24 to downstream section 24, an increasing percentage of undesired particles 35 and adhesive particles 40 accumulate on collection plates 28.

FIG. 3 is a side view of a portion of a collection plate 28 that contains an agglomerate of undesired particles 35 and adhesive particles 40. As depicted, after contacting collection plate 28 adhesive particles 40 flow into the interparticle gaps between undesired particles 40, thereby yielding the desired agglomerate. Surfactants may be included in the adhesive composition and, upon contacting the collection plates, will serve to reduce the surface tension of adhesive particles 40 and increase the ability of the adhesive to fill the gaps between undesired particles 35. Useful surfactants in this regard include alkyl aryl polyether and alkyl phenylhydroxypolyoxyethylene.

FIG. 3 further depicts void spaces 42 which result from the cohesion between undesired particles 35 and adhesive particles 40. As illustrated, the resulting dust cake 44 is a porous agglomerate of undesired particles 35 and adhesive particles 40. The porosity of dust cake 44 may be desirably increased by the addition of a dispersant to the adhesive composition employed. Useful dispersants in this regard include phosphates, such as trisodium phosphate, tetrasodium phosphate, and sodium hexamitaphosphate.

While not wishing to be bound by any theory, it is believed that the bonding mechanism between the adhesive particles 40 and undesired particles 35 is mechanical and/or ionic in nature. Regarding mechanical bonding, it is believed that longer polymer chains more efficiently attract and entrap fine undesired particles 35 when compared to shorter polymer chains in the adhesive molecules. For this reason, higher molecular weight adhesive polymers more effectively form clumps of fines in the dust cake 44 than lower molecular weight adhesive polymers. Regarding ionic bonding, it is believed that the polarity of the polymer impacts the ability of the adhesive molecules to bond to undesired particles 35.

Referring to FIGS. 1–3, dust cake 44 can be removed from collection plate 28 by many techniques, including rapping of the collection plate 28 and sonic horns. The preferred methodology for dust cake removal involves vibration of the collection plate 28. When collection plate 28 is vibrated, dust cake 44 separates from collection plate 28 in large sheets and falls into hoppers 18 for disposal. It is believed that adhesive particles 40 increase the attractive force between undesired particles 35. The increased interparticle forces of attraction induce a high degree of cohesiveness in dust cake 44. The high dust cake cohesiveness is thought to prevent the release of finer undesired particles during dust cake removal.

Compared to the dust cakes formed in conventional electrostatic precipitators, the cohesiveness of dust cake 44 yields many advantages. First, as noted above the cohesiveness of dust cake 44 causes dust cake 44 to form large, consolidated sheets during dust cake removal and therefore reduces the fragmentation of dust cake 44 and reentrainment of undesired particles 35 during dust cake removal. The decreased incidence of undesired particle reentrainment in the present invention reduces particulate emissions relative to conventional electrostatic precipitators. Second, the cohesive sheets also reduce problems of conventional electrostatic precipitators from handling and storing loosely consolidated, fine undesired particles. Undesired particles 35 are typically only about 10 microns in size. Finally, the vaporization of the majority of the liquid carrier fluid before dust cake formation produces a solid mass that avoids problems commonly associated with slurry handling and disposal.

A second embodiment of the present invention is a filtration system for removal of undesired particles, such as fly ash from a gas stream. Referring to FIGS. 2, 4 and 5, a filtration system 45 includes a housing assembly 46, filtrating assembly 48, and adhesive injection assembly 10. Housing assembly 46 includes an input duct 50, filtration shell 52, output duct 54, and hoppers 56. Filtrating assembly 48 includes a plurality of filters 58 suspended from a header (not shown). A support apparatus (not shown), such as a cage, may be used to prevent deflation of filters 58. Again, adhesive injection assembly 10 includes a reservoir (not shown), feed line 34, and nozzles 37.

In operation, gas stream 36 enters the filtration shell 52 through the input duct 50. Before gas stream 36 contacts filters 58, adhesive composition droplets 38 are injected into gas stream 36. Preferably, by the time gas stream 36 contacts filters 58 a substantial portion of the liquid carrier fluid, preferably about 90% or more by weight, in droplets 38 has vaporized, and adhesive particles 40 are dispersed. Filters 58 pass the gaseous components of gas stream 36 but remove undesired particles 35 and adhesive particles 40. As will be appreciated, filters 58 may be of ceramic, fabric, paper or metal construction.

As shown in FIG. 5, undesired particles 35 and adhesive particles 40 collect on the exterior of filter 58. As in the above discussion, void spaces 42 are formed as undesired particles 35 and adhesive particles 40 collect on the exterior of filter 58. Compared to conventional filtration systems, void spaces 42 substantially reduce the incidence of undesired particles 35 blocking the filter pores. As noted above, such blockages cause a large pressure drop across the filter and necessitate frequent removal of dust cake 44 from filter 58. The porous dust cakes 44 of the present invention reduce the pressure drop across filters 58 and therefore filters 58 require less frequent cleanings. Accordingly, the present invention has a lower incidence of undesired particle reentrainment in gas stream 36 than conventional filtration plants. Compared to conventional filtration plants, the formation by undesired particles 35 and adhesive particles 40 of a cohesive agglomerate reduces the incidence of very fine undesired particles 35 "bleeding through" filter pores and becoming reentrained in gas stream 36 and this results in increased collection efficiency.

As will be appreciated, a number of methodologies exist to remove dust cake 44 from filters 58 including shaker-cleaning filters, shake-deflate filters, sonic-horns, pulse-jet-cleaned filters, and reverse-air-cleaned filters. In each case, a mechanism for cleaning the filters is vibration and the dust cake 44 falls into hoppers 56 for collection. Filters 58 may also be removably mounted to the header so that they may be removed, cleaned, and reinstalled.

The cohesiveness of dust cake 44 facilitates the dust cake's removal. As a result of the increased interparticle cohesion induced by adhesive particles 40, dust cake 44 remains in consolidated chunks after removal. The formation of consolidated chunks of dust cake 44 simplifies the handling and storing of undesired particles when compared to conventional filtration systems.

After passing through filter 58, gas stream 36 flows from the filtration shell 52 to output duct 54 for additional treatment or disposal.

EXAMPLE

Tests of sodium carboxymethylcellulose ("Adhesive A") and xanthan gum ("Adhesive B") were conducted using a 100-acfm dry electrostatic precipitator drawing flue gas from a 1.5 million BTU/hr combuster. Insitec analyzers were installed in the input and output ducts of the electrostatic precipitator to measure undesired particle collection efficiency. The electrostatic precipitator was "lined-out" to operate at 10–12 kV at a current density of 0.5–1.5 mA. The adhesives were dissolved in water at a concentration of about 0.1% by weight. The solutions were injected into the gas stream through spray nozzles. The Sauter mean diameter of the droplets of the sprayed composition was about 15 microns.

Tests were run using Adhesive A at concentrations of adhesive in the gas stream of approximately 0.05% and 2.5% (wt additive/wt undesired particles). A decrease in undesired particle loading in the outlet of the electrostatic precipitator was observed for the additive at the 0.05% concentration. An increase in the undesired particle loading leaving the electrostatic precipitator was observed during the injection of the 2.5% concentration. Adhesive B was injected at a concentration of 0.05% and was also found to decrease undesired particle loading at the electrostatic precipitator outlet.

The electrostatic precipitator was modified by the installation of baffles at the input and output ducts to distribute the flow of the gas stream more uniformly through the active portions of the electrostatic precipitator. The modification improved electrostatic precipitator efficiency from approximately 50% to over 70%. After the modification, Adhesive A was injected at a rate to produce a concentration of 0.05% (wt additive/wt undesired particles). Efficiency improved from about 73% to about 83%. In other words, Adhesive A decreased undesired particle emissions by about 39%. Rapping the collection plates established that the dust cake would dislodge in "flakes". Undesired particle buildup did not prove any more severe than buildup without adhesive present.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A process for removing undesired solid particles from a gas stream containing water vapor comprising:
   - contacting with said gas stream a composition comprising an organic adhesive wherein said organic adhesive is an organic compound selected from the group consisting of gums, cellulose, and vinyls and mixtures thereof;
   - collecting said undesired solid particles and organic adhesive on at least one collection surface in a collection zone to form on said collection surface a solid agglomerate comprising said organic adhesive and undesired solid particles wherein the collection surface has a temperature greater than the condensation temperature of said water vapor; and
   - removing said solid agglomerate from said collection surface.

2. The process, as claimed in claim 1, wherein said collecting step comprises the substep of adhering said undesired particles and particles of said organic adhesive to said collection surface.

3. The process, as claimed in claim 1, wherein said collecting step further comprises imparting an electrical charge to said undesired particles and particles of said organic adhesive and electrically attracting said electrically charged particles to said collection surface.

4. The process, as claimed in claim 1, wherein said collecting step comprises filtering said undesired particles and particles of said organic adhesive from said gas stream.

5. The process, as claimed in claim 1, wherein said removing step comprises the substep of removing said collection surface from said collection zone.

6. The process, as claimed in claim 1, wherein said removing step further comprises the substep of removing said undesired particles and particles of said composition from said collection surface and thereafter collecting said undesired particles and particles of said composition in a hopper.

7. The process, as claimed in claim 6, wherein said removing of said undesired particles and particles of said composition is by vibration of said collection surface.

8. The process, as claimed in claim 1, wherein said contacting step comprises the substep of dispersing particles of said composition into said gas stream.

9. The process, as claimed in claim 8, wherein said dispersing step comprises the substep of atomizing the particles of said composition into said gas stream.

10. The process, as claimed in claim 8, wherein said dispersing step comprises the substep of imparting a charge to said composition comprising an organic adhesive.

11. The process, as claimed in claim 1, wherein said composition further comprises a carrier fluid that vaporizes in said gas stream.

12. The process, as claimed in claim 11, wherein a substantial portion of the carrier fluid vaporizes before said composition comprising an organic adhesive contacts said collection surface.

13. The process, as claimed in claim 12, wherein at least 90% by weight of said carrier fluid vaporizes before said composition comprising an organic adhesive contacts said collection surface.

14. The process, as claimed in claim 11, wherein the concentration of said organic adhesive in said carrier fluid ranges from about 0.005% to about 10% by volume.

15. The process, as claimed in claim 11, wherein the concentration of said organic adhesive in said carrier fluid ranges from about 0.05% to about 1% by volume.

16. The process, as claimed in claim 11, wherein the temperature of said collection surface is greater than the condensation temperature of said carrier fluid.

17. The process, as claimed in claim 1, wherein said contacting step comprises the substep of deflecting said gas stream prior to said gas stream contacting the collection surface.

18. The process, as claimed in claim 1, wherein said removing of said agglomerate is by contacting said collection surface with a reverse gas stream having a direction of flow substantially opposite to said gas stream.

19. A process for removing undesired solid particles from a gas stream comprising:
   contacting said undesired solid particles with an adhesive composition comprising an organic adhesive, said organic adhesive being an organic compound selected from the group consisting of gums, cellulose, and vinyls and mixtures thereof and a carrier fluid and collecting said undesired solid particles and adhesive composition on a collection surface to form a solid agglomerate, wherein at least a substantial portion of said carrier fluid is vaporized prior to said adhesive composition contacting said collection surface.

20. The process, as claimed in claim 19, wherein said adhesive composition is nontoxic and substantially odorless.

21. The process, as claimed in claim 19, wherein said adhesive is selected from the group consisting of anionic and nonionic polymers.

22. The process, as claimed in claim 19, wherein said adhesive is selected from the group consisting of carboxymethylcellulose and xanthan gum.

23. The process, as claimed in claim 19, wherein said carrier fluid vaporizes in said gas stream after said contacting step to produce particles of said adhesive in said gas stream.

24. The process, as claimed in claim 23, wherein the concentration of particles of said adhesive in said gas stream relative to the concentration of the undesired particles in said gas stream ranges from about 0.01% to about 1% by weight.

25. The process, as claimed in claim 23, wherein the size of said particles of adhesive ranges from about 1 to about 10 micrometers.

26. The process, as claimed in claim 19, wherein the temperature of said collection surface is greater than the condensation temperature of water vapor in said gas stream.

27. The process, as claimed in claim 19, wherein at least 90% by weight of said carrier fluid is removed from said adhesive composition prior to said adhesive composition contacting said collection surface.

28. The process, as claimed in claim 19, wherein said carrier fluid comprises water.

29. An apparatus to remove undesired solid particles from an input gas stream containing water vapor comprising:
   a housing;
   input means for introducing said input gas stream into said housing;
   output means for removing an output gas stream from said housing;
   an adhesive injection means to inject a composition comprising adhesive particles into said input gas stream, said adhesive particles composing an organic compound selected from the group consisting of gums, cellulose and vinyls and mixtures thereof; and
   a collection means supportively positioned within said housing to collect said undesired solid particles and said adhesive particles to form a solid agglomerate of the solid particles and adhesive particles on the collection means, wherein the collection means has a temperature greater than the condensation temperature of the water vapor in the gas stream.

30. The apparatus, as claimed in claim 29, wherein said collection means comprises filter means to separate said undesired particles and adhesive particles from said input gas stream.

31. The apparatus, as claimed in claim 30, wherein said filter means has a pore size smaller than a substantial portion of said adhesive particles.

32. The apparatus, as claimed in claim 29, wherein said filter means is removably disposed within said housing.

33. The apparatus, as claimed in claim 29, wherein said filter means is located transverse to the direction of flow of said input gas stream.

34. The apparatus, as claimed in claim 29, wherein said housing comprises a hopper means to collect said undesired particles and adhesive particles removed from said collection means.

35. The apparatus, as claimed in claim 29, wherein said collection means comprises:
   a power supply having positive and negative terminals;
   at least one electrode means electrically connected to said negative terminal of said power supply and positioned relative to said input gas stream in said housing to impart a charge to said undesired particles and adhesive particles in said input gas stream; and
   at least one collector means electrically connected to said positive terminal of said power supply and positioned within said housing relative to said electrode means to accumulate said charged particles on said collector means.

36. The apparatus, as claimed in claim 35, wherein said collection means is positioned substantially parallel to the direction of flow of said input gas stream.

37. The apparatus, as claimed in claim 29, wherein said apparatus comprises a plurality of said collection means.

38. The apparatus, as claimed in claim 29, wherein said undesired particles and adhesive particles collect on at least two surfaces of said collection means.

39. The apparatus, as claimed in claim 29, wherein said adhesive injection means comprises a plurality of nozzle means positioned across said input gas stream to disperse adhesive particles into said input gas stream.

40. The apparatus, as claimed in claim 29, wherein said adhesive injection means is located upstream of said collection means at a distance sufficient for a substantial amount of a carrier fluid comprising said adhesive particles to separate from said adhesive particles before contacting said collection means.

41. The apparatus, as claimed in claim 40, wherein said distance is sufficient for at least 90% by weight of said carrier fluid to separate from said adhesive particles before contacting said collection means.

42. The apparatus, as claimed in claim 29, wherein said adhesive injection means comprises nozzle means to atomize said composition into said input gas stream.

43. The apparatus, as claimed in claim 42, wherein said nozzle means comprises an electrostatic injection nozzle.

44. The apparatus, as claimed in claim 29, wherein said adhesive injection means is located in said input means.

45. The apparatus, as claimed in claim 29, wherein said apparatus further comprises a deflecting means to deflect said input gas stream in the direction of said collection means.

46. A process for removing undesired solid particles from a gas stream containing water vapor and having a gas stream temperature, comprising:

contacting with the gas stream a liquid composition comprising a porosity inducing agent in liquid form, at least a substantial portion of the porosity inducing agent remaining in the liquid phase at the gas stream temperature, the porosity inducing agent inducing the formation of void spaces between undesired solid particles in a porous solid agglomerate on a collection surface;

maintaining, after the contacting step and until the collection step, at least most of the porosity inducing agent in the form of liquid droplets;

collecting the undesired solid particles and the droplets of the porosity inducing agent on the collection surface to form the porous solid agglomerate comprising the undesired solid particles and the porosity inducing agent, wherein the collection surface has a temperature greater than the condensation temperature of the water vapor in the gas stream, wherein, after the contacting step at least most of the porosity inducing agent is substantially free of vaporization and condensation; and removing the porous solid agglomerate from the collection surface.

47. The process of claim 46, wherein in the collecting step the at least most of the porosity inducing agent and undesired particles are separate from one another.

48. The process of claim 46, wherein the porosity inducing agent is an adhesive.

* * * * *